United States Patent
Kebabian et al.

(10) Patent No.: US 10,498,208 B1
(45) Date of Patent: Dec. 3, 2019

(54) LIGHTWEIGHT RETURN FLUX ALTERNATOR

(71) Applicant: Aerodyne Research, Inc., Billerica, MA (US)

(72) Inventors: Paul L. Kebabian, Acton, MA (US); Kurt D. Annen, Rowley, MA (US); Richard N. Jorgenson, Amherst, NH (US)

(73) Assignee: Aerodyne Research, Inc., Billerica, MA (US)

( * ) Notice: Subject to any disclaimer, the term of this patent is extended or adjusted under 35 U.S.C. 154(b) by 254 days.

(21) Appl. No.: 15/384,965

(22) Filed: Dec. 20, 2016

(51) Int. Cl.
| | |
|---|---|
| *H02K 35/04* | (2006.01) |
| *H02K 7/18* | (2006.01) |
| *H02K 5/02* | (2006.01) |
| *H02K 1/02* | (2006.01) |
| *H01F 7/02* | (2006.01) |
| *F02B 63/04* | (2006.01) |

(52) U.S. Cl.
CPC ........... *H02K 35/04* (2013.01); *F02B 63/041* (2013.01); *H01F 7/021* (2013.01); *H02K 1/02* (2013.01); *H02K 5/02* (2013.01); *H02K 7/1884* (2013.01)

(58) Field of Classification Search
CPC ........... H02K 35/04; H02K 1/02; H02K 5/02; H02K 7/1884; F02B 63/041; H01F 7/021
See application file for complete search history.

(56) References Cited

U.S. PATENT DOCUMENTS

| | | | |
|---|---|---|---|
| 4,500,827 A | 2/1985 | Merritt et al. | |
| 4,532,431 A | 7/1985 | Iliev et al. | |
| 5,347,186 A | 9/1994 | Konotchick | |
| 5,893,343 A | 4/1999 | Rigazzi | |
| 6,199,519 B1 * | 3/2001 | Van Blarigan | F02B 71/04 123/46 R |
| 6,349,683 B1 | 2/2002 | Annen et al. | |
| 6,479,964 B2 | 11/2002 | Woodroffe et al. | |
| 7,485,977 B2 | 2/2009 | Annen et al. | |
| 7,629,699 B2 | 12/2009 | Annen et al. | |

(Continued)

OTHER PUBLICATIONS

"Advanced Magnetics for Motion Control: High Performance Rotary & Linear Components," BEI Kimco, Sensata Technologies, Jun. 27, 2016, pp. 1-6.

(Continued)

*Primary Examiner* — Jue Zhang
(74) *Attorney, Agent, or Firm* — Cesari and McKenna, LLP; James A. Blanchette

(57) ABSTRACT

In one embodiment, a return flux linear alternator employs a magnet assembly that includes a pair of permanent ring magnets with opposing polarity and a pair of air gaps. The additional permanent ring and air gap complete a magnetic flux loop of the alternator rather than the magnet pole, as in traditional designs. An alternator coil assembly includes a pair of oppositely wound coil sections that each linearly move through a respective one of the pair of air gaps. In addition, the return flux linear alternator may employ a variety of structures to increase mechanical strength, including a reinforcement fabric, and a variety of structures to increase electrical efficiency, including a thermally conductive but electrically nonconductive spacer between the coil sections and multiple pairs of electrical leads.

20 Claims, 10 Drawing Sheets

(56) References Cited

U.S. PATENT DOCUMENTS

| | | | |
|---|---|---|---|
| 8,737,787 B2 | 5/2014 | Gimblet et al. | |
| 2002/0141609 A1* | 10/2002 | Ishigaki | H04R 9/046 |
| | | | 381/407 |
| 2005/0103287 A1* | 5/2005 | Hofbauer | F02B 1/12 |
| | | | 123/46 E |
| 2005/0190946 A1* | 9/2005 | Stiles | H04R 9/025 |
| | | | 381/421 |
| 2007/0158947 A1* | 7/2007 | Annen | F02B 63/04 |
| | | | 290/1 R |
| 2007/0297639 A1* | 12/2007 | Noll | H04R 9/063 |
| | | | 381/421 |
| 2009/0133397 A1* | 5/2009 | Owens | F02G 1/0435 |
| | | | 60/520 |

OTHER PUBLICATIONS

Leung, Chung Ming, et al., "Airfoil-based Electromagnetic Energy Harvester Containing Parallel Array Motion Between Moving Coil and Multi-pole Magnets Towards Enhanced Power Density," AIP Review of Scientific Instruments, vol. 87, No. 114705, Nov. 15, 2016, pp. 1-8.

"Linear Actuator: LA12-17-000A," BEI Kimco Magnetics Division, Oct. 27, 1994, one page.

\* cited by examiner

LIGHTWEIGHT RETURN FLUX ALTERNATOR

STATEMENT REGARDING FEDERALLY SUPPORTED RESEARCH

This invention was made with Government support under contract no. FA8650-12-C-7239 awarded by the Department of the Air Force. The Government has certain rights in this invention.

BACKGROUND

Technical Field

The present disclosure relates generally to power generation, and more particularly to alternators for use with, for example, linear electric generators.

Background Information

There are many applications (such as aerial drones, portable tools, portable electronic equipment, etc.) where small, lightweight, high power density and high energy capacity power sources are needed. A variety of technologies have been utilized in attempts to address these needs. One technology is batteries, including lithium-ion batteries and nickel-cadmium batteries. However, despite recent advances, batteries typically still exhibit low power density (e.g., less than 300 watt-hours per kilogram). Given the low power density, to achieve the energy capacity required by some applications, batteries of excessive size must be employed.

Fuel cells are another technology that has been long investigated. Yet while fuel cells have shown promising results in laboratory conditions, they have proven difficult to deploy in the real world.

Another approach is miniature internal-combustion linear electric generators. Because of their high power density, such electric generators can achieve high energy capacities within a small space profile. FIG. 1 is a cross section view of one existing miniature internal-combustion linear electric generator 100. A cylinder head 105 is provided that includes an exhaust port, inlet port and transfer ports. The cylinder head 105 is affixed to an engine casing 110 in which a cylinder 115 and piston 120 are disposed. A rod 125 extends from the piston 120 into a spring casing 130, in which a spring 135 is arranged encircling the rod 125. The spring 135 has a first end that is rigidly coupled to the spring casing 130. A second, movable end of the spring 135 is affixed to the end of the rod 125, and to components of a traditional linear alternator 140.

Looking to the traditional linear alternator 140 in more detail, the alternator includes an alternator coil 145 wound in one direction that is attached via a coil standoff 150 to the movable end of the spring 135, and extends into an air gap of a magnet assembly. The magnet assembly includes a single permanent ring magnet 155 and a magnet pole 160 made from a relatively heavy, soft magnetic alloy.

In operation, combustion in the cylinder 115 actuates the piston 120, which provides power to move the alternator coil 145 against the electromagnetic force resistance on the coil to generate electrical power while the spring 135 maintains linearly oscillating motion of the coil and piston as it stores and releases energy. The electrical energy is fed from the generator 100 via a single pair of electrical leads (not shown) that may run from the coil out of the bottom of the alternator 140, for example through a guide tube.

While such a miniature internal-combustion linear electric generator has a number of advantages over other technologies, it still may be heavier than desired for certain applications where weight is especially important. A major source of weight in a traditional linear alternator 140 is the magnet pole 160, which typically comprises about half the total weight.

FIG. 2 is a cross section enlargement of a portion 200 of the traditional linear alternator 140 of FIG. 1, showing the magnet pole 160 and magnetic flux lines of the magnetic flux loop. The magnet pole 160 is a formed from a single piece of soft metallic alloy, which for purposes of explanation is categorized into several portions, including an inner magnet pole 210, an outer magnet pole 220, and a connecting portion 230. Magnetic flux lines of the magnetic flux loop extend from permanent ring magnet 155, through the outer pole 210, the connecting portion 230, the inner pole 220 and then across the air gap 240. In order to encompass the magnetic flux loop while allowing for movement of the alternator coil, the soft magnetic alloy of the magnet pole 160 extends a substantial distance below the bottom of the permanent magnet 155 (e.g., at least half of the height of the alternator coil 145 plus a clearance margin). The volume due to the extension imposes a significant weight burden.

In addition to the significant weight caused by the large, heavy magnet pole 160, traditional linear alternator designs also have a number of other shortcomings. For example, the alternator coil 145 of a traditional linear alternator 140 may have less than desired mechanical strength, such that it may lack the robustness desired for certain use cases. Likewise, the alternator coil 145 of a traditional linear alternator 140 may have less than desired electrical performance due to, among other factors, heating effects in the coil and resistance in the single pair of electrical leads typically extending therefrom.

Accordingly, there is a need for an improved linear alternator that may be used with, for example, a linear electric generator, which is reduced in weight in comparison to traditional linear alternator designs. In addition to weight reduction, it would also be desirable to provide increased mechanical strength and increased electrical efficiency in comparison to traditional linear alternator designs.

SUMMARY

A return flux linear alternator may employ a magnet assembly that includes a pair of permanent ring magnets with opposing polarity and a pair of air gaps. The additional permanent ring and air gap complete a magnetic flux loop of the alternator, rather than the magnet pole as in traditional designs, allowing for a reduction in the volume of the magnet pole, and thereby a reduction in weight. An alternator coil assembly used in the return flux linear alternator may include a pair of oppositely wound coil sections that each linearly move through a respective one of the pair of air gaps. In addition, the return flux linear alternator may employ a variety of structures to increase mechanical strength, including a reinforcement fabric, and a variety of structures to increase electrical efficiency, including a thermally conductive but electrically nonconductive spacer between the coil sections and multiple pairs of electrical leads.

In one embodiment, the magnet assembly of the return flux linear alternator includes an upper permanent ring magnet having a first polarity defining an upper air gap, a lower permanent ring magnet having a second polarity that is opposite the first polarity defining a lower air gap, a magnet spacer positioned between the upper permanent ring magnet and the lower permanent ring magnet, and a magnet pole. The magnet pole includes an inner magnet pole and a separate outer magnet pole, each of which has limited volume and does not extend lower in an axial direction than the lower permanent ring. The two portions of the magnet pole are held in place by a lightweight alternator casing. A linearly-movable alternator coil assembly includes a coil having an upper coil section wound in a first direction movable in the upper air gap and a lower coil section wound in a second direction that is opposite the first direction movable in the lower air gap. A coil spacer is positioned between the upper coil section and the lower coil section. A magnetic flux loop is created that extends through the upper permanent magnet, the upper air gap, the inner magnet pole, the lower air gap, the lower permanent magnet and the outer magnet pole.

Further, in some embodiments, the upper coil section of the alternator coil assembly is coupled to a coil standoff. Mechanical strength of the coupling and the coil itself are increased by a layer of reinforcement fabric (e.g., of aramid fiber), that extends above the upper coil section and is bonded to the coil standoff, and extends below the lower coil section and is wrapped about and outer surface of the lower coil section. Electrical efficiency is increased by making the coil spacer from a thermally conductive but electrically nonconductive material, such as aluminum nitride-boron nitride composite ceramic. Further, a first crown terminal is coupled to the alternator coil assembly, and a second crown terminal is coupled to an upper portion of the spring. A plurality of pairs of electrical leads are employed to extend between the first crown terminal and the second crown terminal.

It should be understood that a variety of additional features and alternative embodiments may be implemented other than those discussed in this Summary. This Summary is intended simply as a brief introduction to the reader for the further description which follows, and does not indicate or imply that the examples mentioned herein cover all aspects of the disclosure, or are necessary or essential aspects of the disclosure.

BRIEF DESCRIPTION OF THE DRAWINGS

The description refers to the accompanying drawings of example embodiments, of which.

DETAILED DESCRIPTION OF ILLUSTRATIVE EMBODIMENTS

Definitions

As use herein the term "upper" in reference to an arrangement of components of a linear generator is used to refer to positioning in an axial direction closer to the cylinder head. Likewise, the term "lower" in reference to an arrangement of components of a linear generator is used to refer to positioning in an axial direction further away from the cylinder head. While "upper" and "lower" often correspond with general upwards and downwards directions in the general environment (i.e. towards the surface of the Earth or away from the surface of the Earth), it should be understood that the linear generator may be oriented in various manners (e.g., inverted), and when this is the case the terms do not necessarily so correspond.

Technical Description

Figure 1:
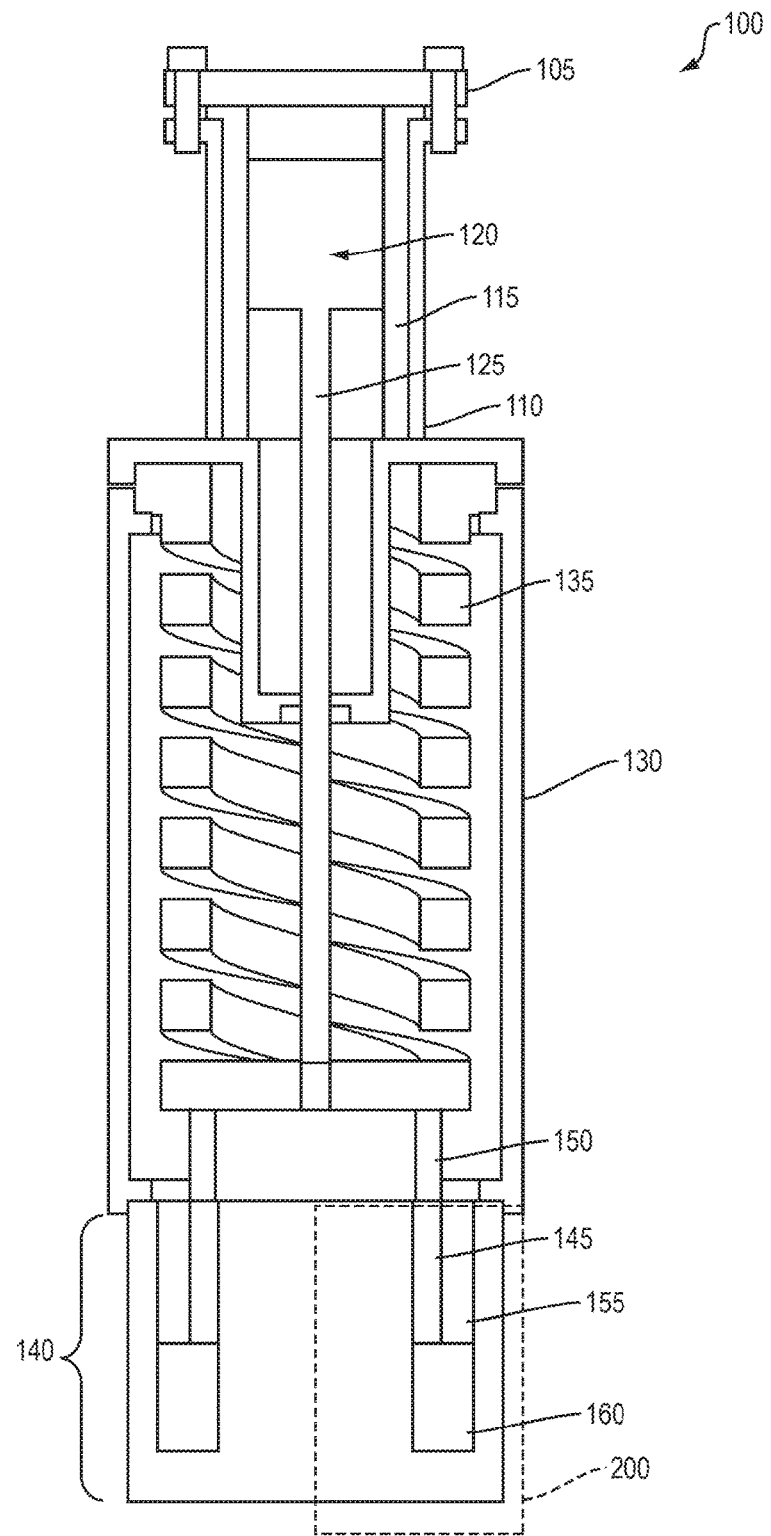
FIG. 1 is a cross section view of one existing miniature internal-combustion linear electric generator.
Figure 2:
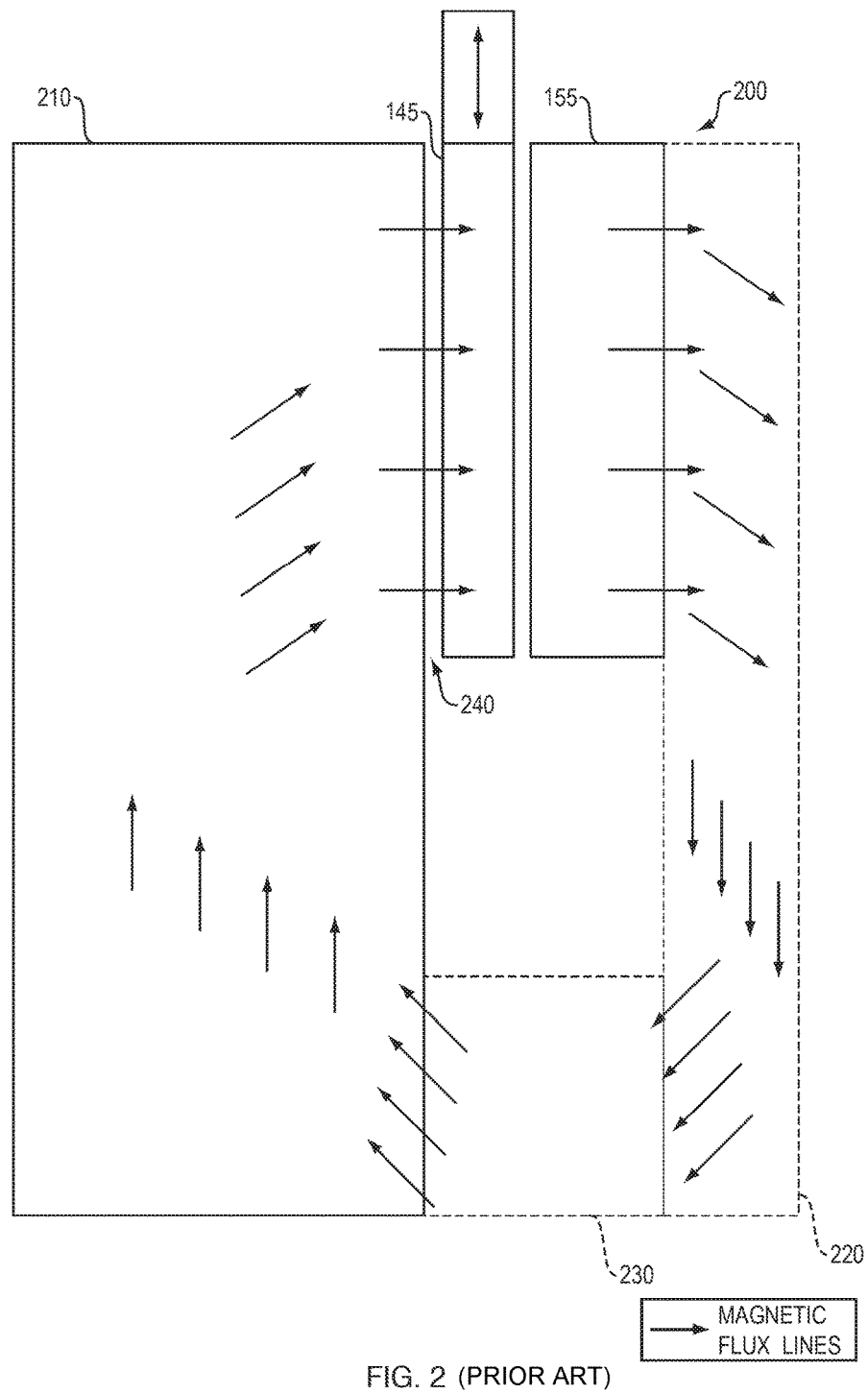
FIG. 2 is a cross section enlargement of a portion of the traditional linear alternator of FIG. 1, showing the magnet pole and magnetic flux lines of the magnetic flux loop.
Figure 3:
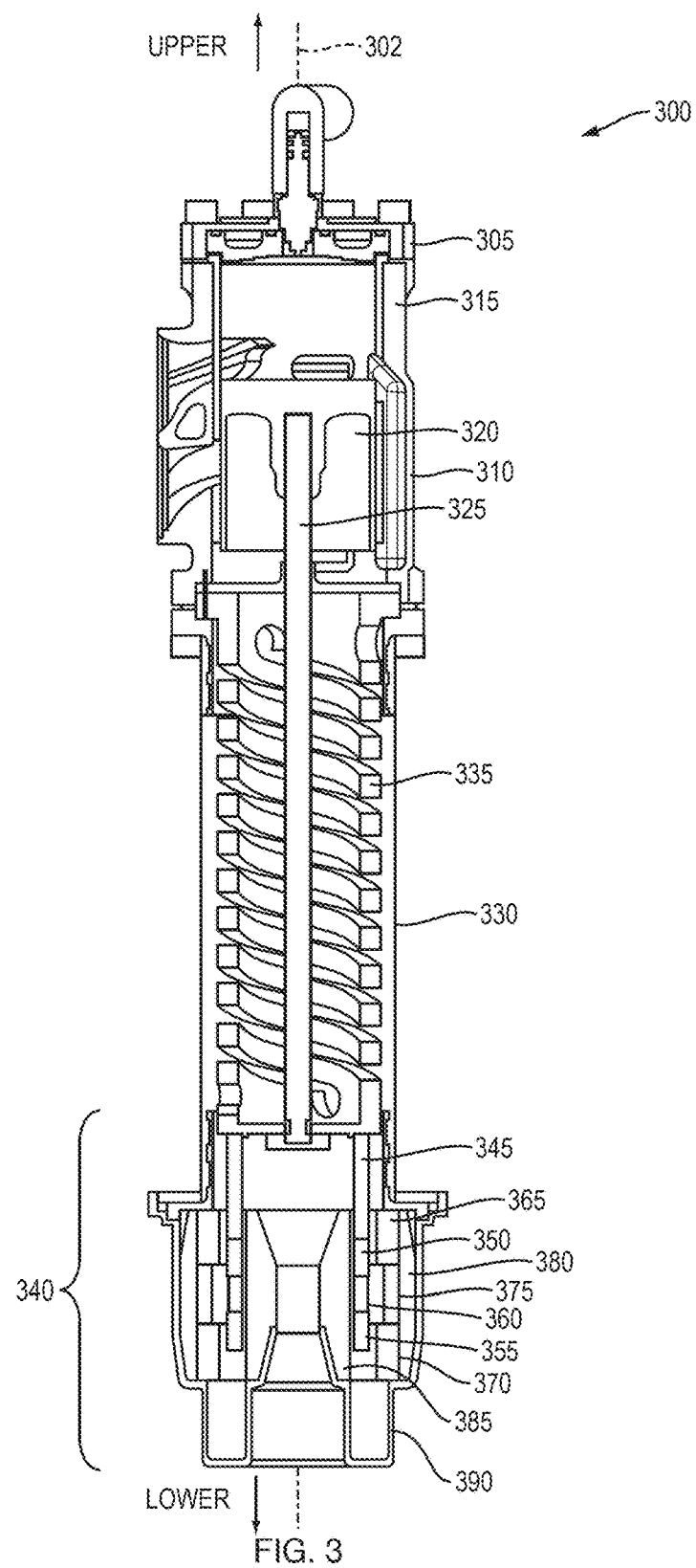
FIG. 3 is a cross section view of an example internal-combustion linear electric generator, including an example return flux linear alternator.

FIG. 3 is a cross section view of an example internal-combustion linear electric generator 300, including an example return flux linear alternator 340. The generator 300 is generally cylindrical in shape, aligned along an axis 302 which defines and axial (e.g., upper and lower) and radial directions. A cylinder head 305 is provided that includes an exhaust port, inlet port, and transfer ports. The cylinder head 305 is affixed to an engine casing 310 in which a cylinder 315 and piston 320 are disposed. A rod 325 axially extends from the piston 320 (e.g., guided by a sleeve bearing) into a spring casing 330 in which a spring 335 (e.g., a triple helix spring) is arranged encircling the rod 325. The spring 335 may be machined from a single piece of material (e.g., a single piece of titanium alloy) or formed via other techniques. The spring 335 has an upper end that is rigidly coupled to the spring casing 330. A movable lower end of the spring 335 is affixed to the lower end of the rod 325 and to a coil stand off 345 of a return flux linear alternator 340. The return flux linear alternator 340 employs a magnet assembly (that is typically stationary) that includes a pair of permanent ring magnets and a pair of air gaps. The pair of permanent ring magnets includes an upper permanent ring magnet 365 and a lower permanent ring magnet 370 with opposing polarity separated by a magnet spacer 375. An alternator coil assembly (that is typically linearly-movable) includes a coil having a pair of oppositely wound coil sections that each move through a respective one of the pair of air gaps. The pair of oppositely wound coil sections include an upper coil section 350 and a lower coil section 355 separated by a coil spacer 360.

Figure 4:
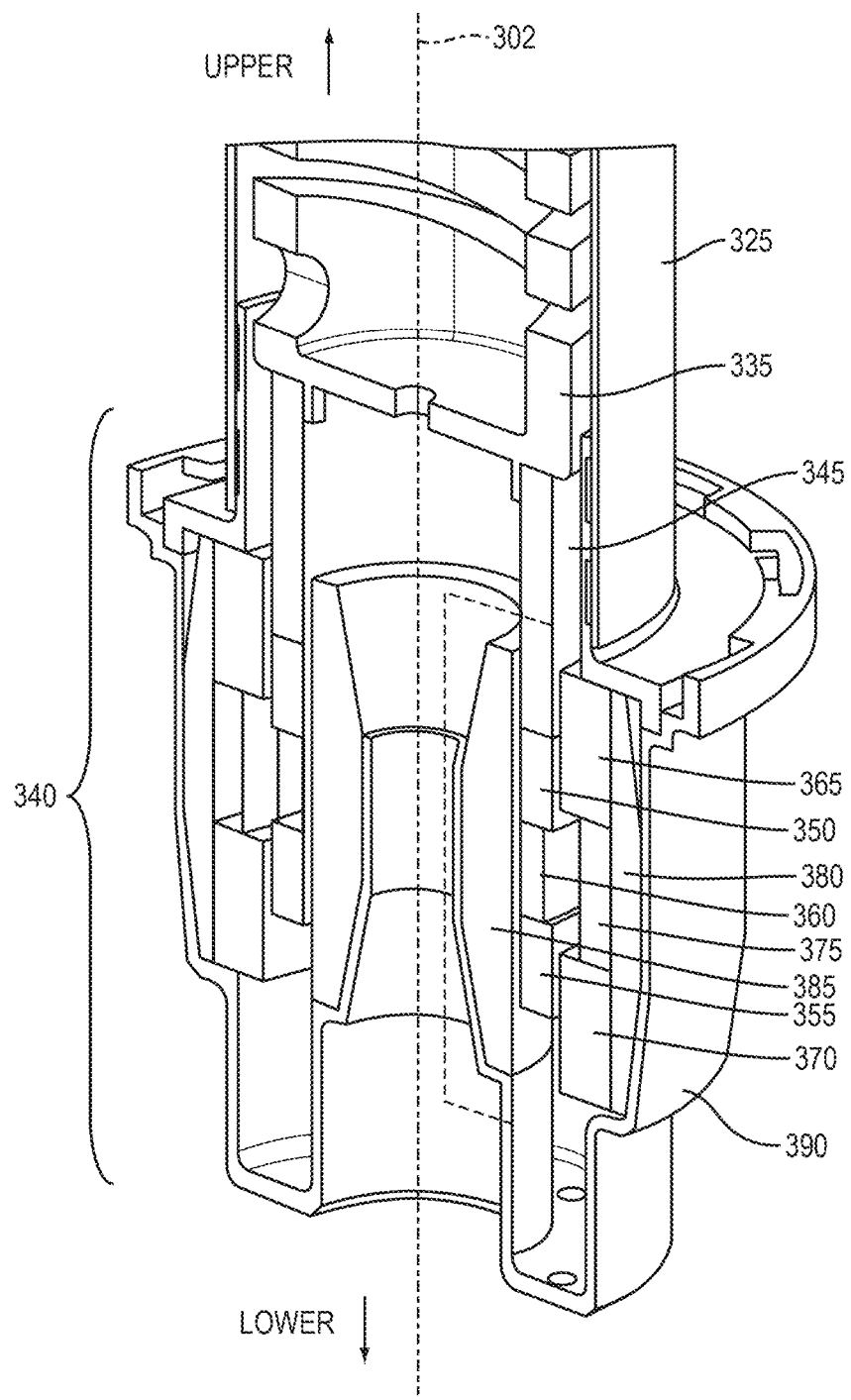
FIG. 4 is an enlarged cut-away perspective view showing details of the example return flux linear alternator of FIG. 3.

FIG. 4 is an enlarged cut-away perspective view showing details of the example return flux linear alternator 340 of FIG. 3. The alternator coil assembly of the return flux linear alternator 340 is coupled to the lower end of the spring 335 via the coil stand off 345. The length of the coil standoff may be selected such that each of the pair of coil sections 350, 355 is disposed in a respective one of the pair of air gaps. The upper coil section 350 is wound in a first direction while the lower coil section 355 that is positioned is wound in a second direction that is opposite the first direction. The coil spacer 360 disposed between the upper coil section 350 and the lower coil section 355 may be formed as a split-ring.

Generally, the alternator coil assembly linearly reciprocates with respect to the magnet assembly, namely the upper permanent ring magnet 365 and the lower permanent ring magnet 370. The permanent ring magnets 365, 370 may be made of samarium cobalt, neodymium-iron-boron or another magnetic material. A magnet pole is positioned radially with respect to the permanent ring magnets 365, 370. The magnet pole may include two separate annular portions, with a first annular portion (referred to as the inner magnet pole 385) disposed within the alternator coil assembly, and the second annular portion (referred to as the outer magnet pole 380) disposed external to the alternator coil assembly, beyond the upper permanent ring magnet 365, magnet spacer 375, and the lower permanent ring magnet 370.

The magnet pole may be made of a relatively heavy soft magnetic alloy, such as HIPERCO® 50A iron-cobalt-vanadium magnetic alloy or another material. Weight is reduced in comparison to a traditional linear alternator design by limiting the volume of the magnet pole. In one embodiment, the magnet pole does not extend lower in an axial direction than the lower permanent ring 370. Instead, a separate alternator casing 390 encloses the magnet pole and holds its inner magnet pole 385 and outer magnet pole 380 in place. The alternator casing 390 may be made from a lightweight material (i.e. a material lighter per unit volume than the magnetic alloy used in the magnet pole), for example, aluminum or plastic.

The inner magnet pole 385 and the outer magnet pole 380 may each have an acute trapezoidal cross section (with the longer base edge disposed facing the alternator coil assembly) or other cross section that removes material where there is a low density of magnetic flux lines. By removing material in such locations, volume may be reduced in comparison with a traditional rectangular cross section, without significantly reducing performance of the return flux linear alternator 340.

Figure 5:
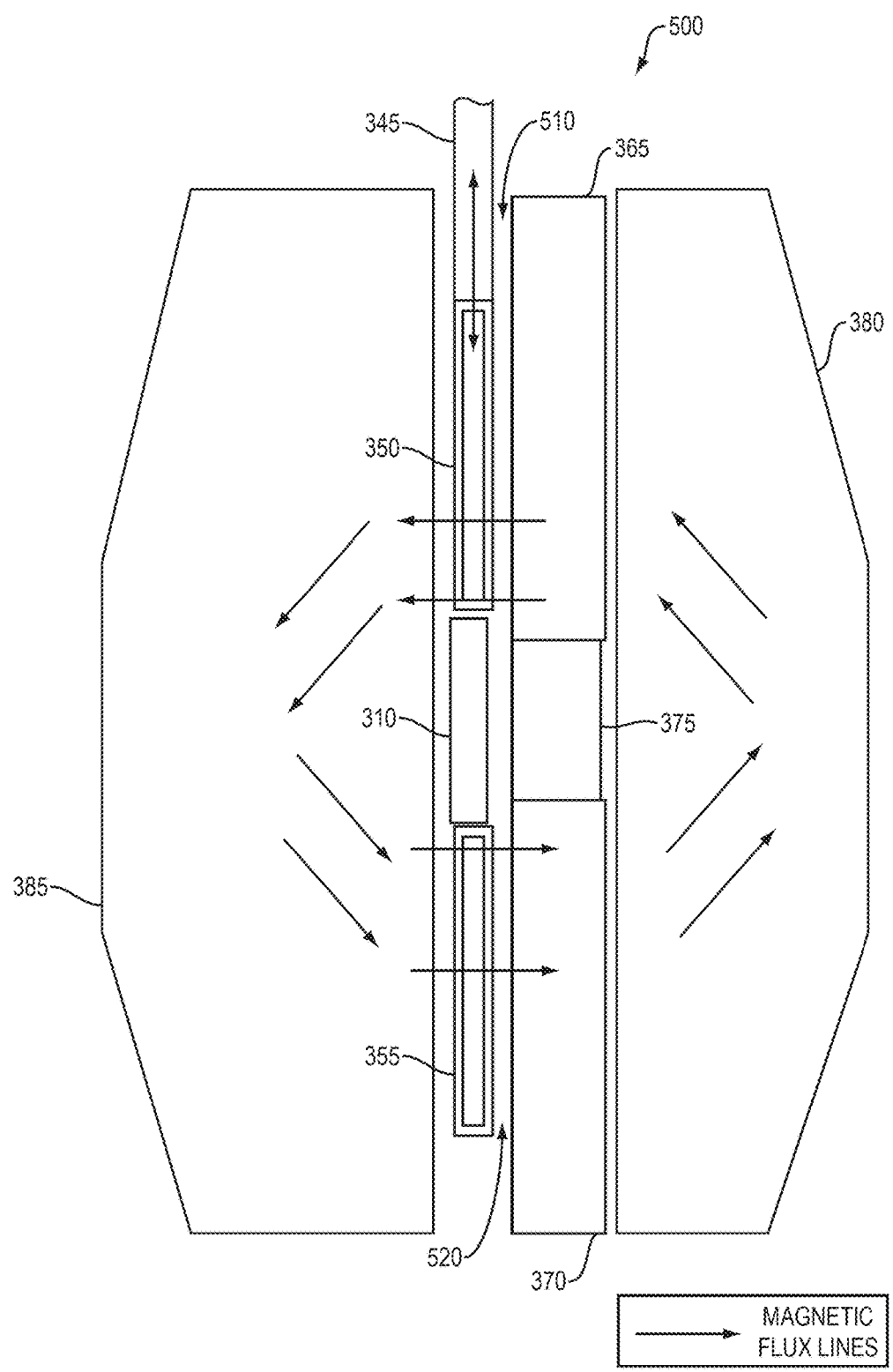
FIG. 5 is a cross section enlargement of a portion of the example return flux linear alternator of FIGS. 3 and 4, showing example magnetic flux lines.
Figure 6:
FIG. 6 is a plot of the magnetic flux lines in an example return flux linear alternator.

FIG. 5 is a cross section enlargement of a portion 500 of the example return flux linear alternator 340 of FIGS. 3 and 4, showing example magnetic flux lines. In this enlargement, a magnetic flux loop is created that extends through the upper permanent ring magnet 365, the upper air gap 510, the inner magnet pole 385, the lower air gap 520, the lower permanent magnet 370 and the outer magnet pole 380. While the cross sectional area of the inner magnet pole 385 and that outer magnet pole 380 is reduced at the upper and lower ends of the poles as a result of the acute trapezoidal shape, so are the magnetic flux lines of the magnetic flux loop. FIG. 6 is a plot 600 of the magnetic flux lines in an example return flux linear alternator. The darker shading 610 on the center portion of the inner magnetic pole 385 and two small regions 620 on the outer magnetic pole 380 represent saturation. As can be seen, there is reduced magnetic flux near the upper and lower ends of the poles.

Figure 7:
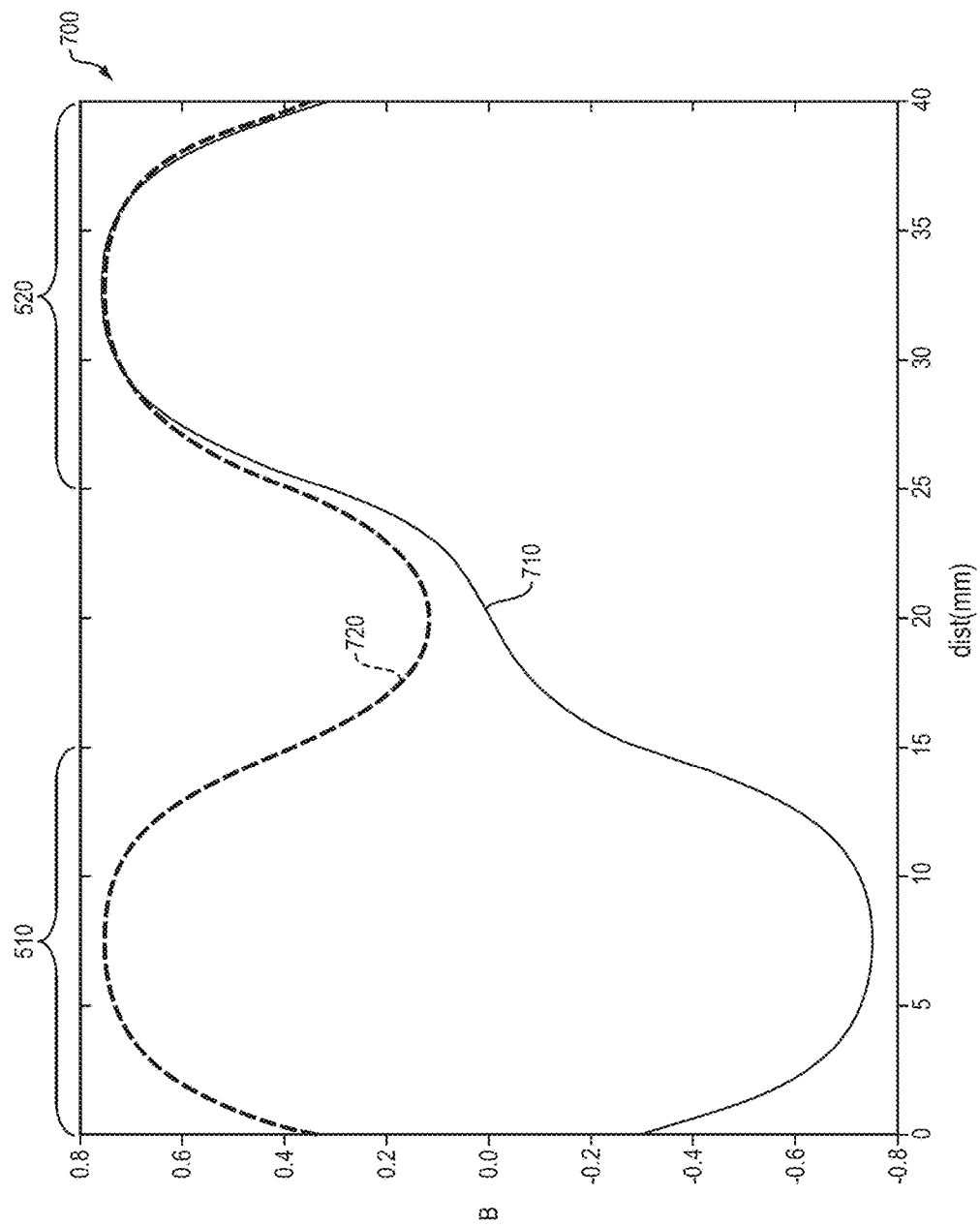
FIG. 7 is a plot of the radial component of magnetic field (specifically B-field) against height in the overall air gap measured from the top of an example return flux linear alternator.

The height of the upper permanent ring magnet 365, magnet spacer 375 and lower permanent ring magnet 370 may be tuned to provide an optimal ratio of alternator power to alternator weight. FIG. 7 is a plot of the radial component of magnetic field (specifically B-field) against height in the overall air gap (which includes both the upper air gap 510 and the lower air gap 520) measured from the top of an example return flux linear alternator. The first plot 710, measuring the B-field vector, shows that the B-field is reversed in the upper air gap 510 and the lower air gap 520. The second plot 720, measuring the total B-field magnitude, shows that the B-field is symmetric for the upper air gap 510 and the lower air gap 520.

Figure 8:
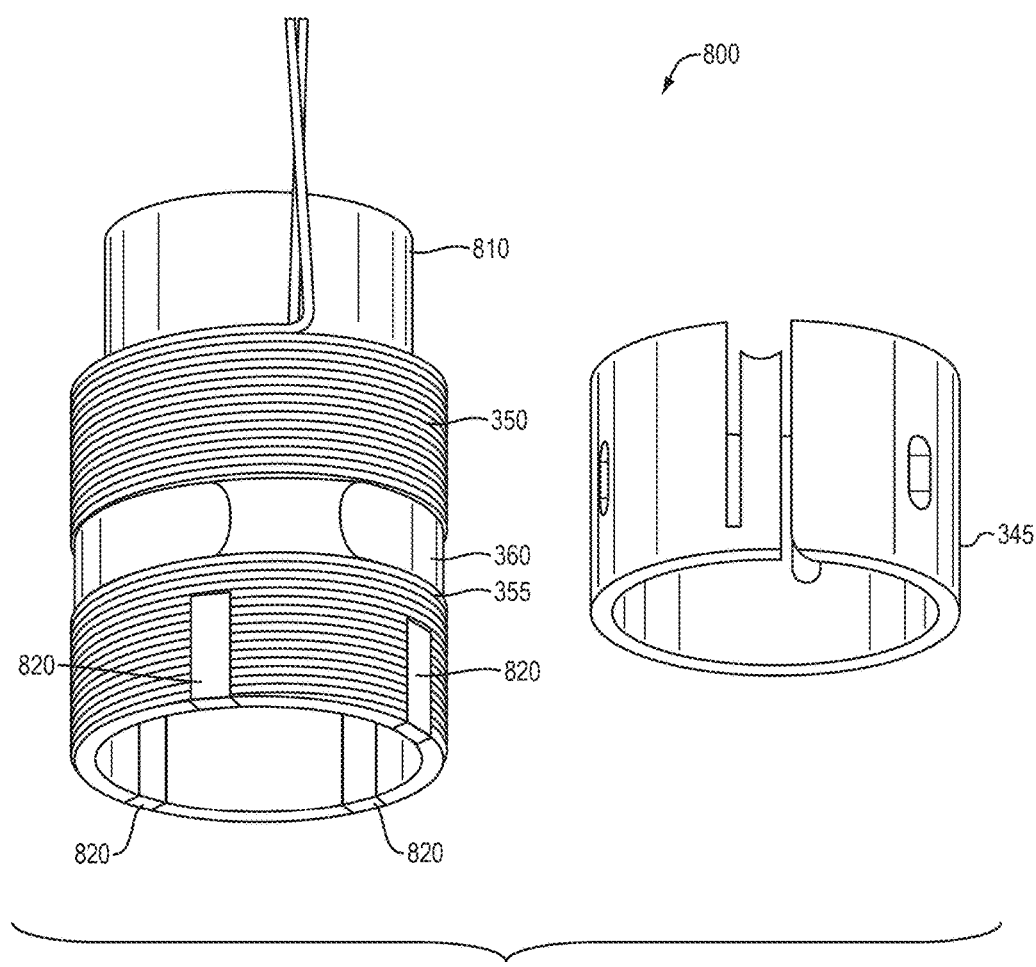
FIG. 8 is a perspective view of an example alternator coil assembly with the coil standoff detached from the upper coil section to reveal an inner layer of reinforcement fabric.
Figure 9:
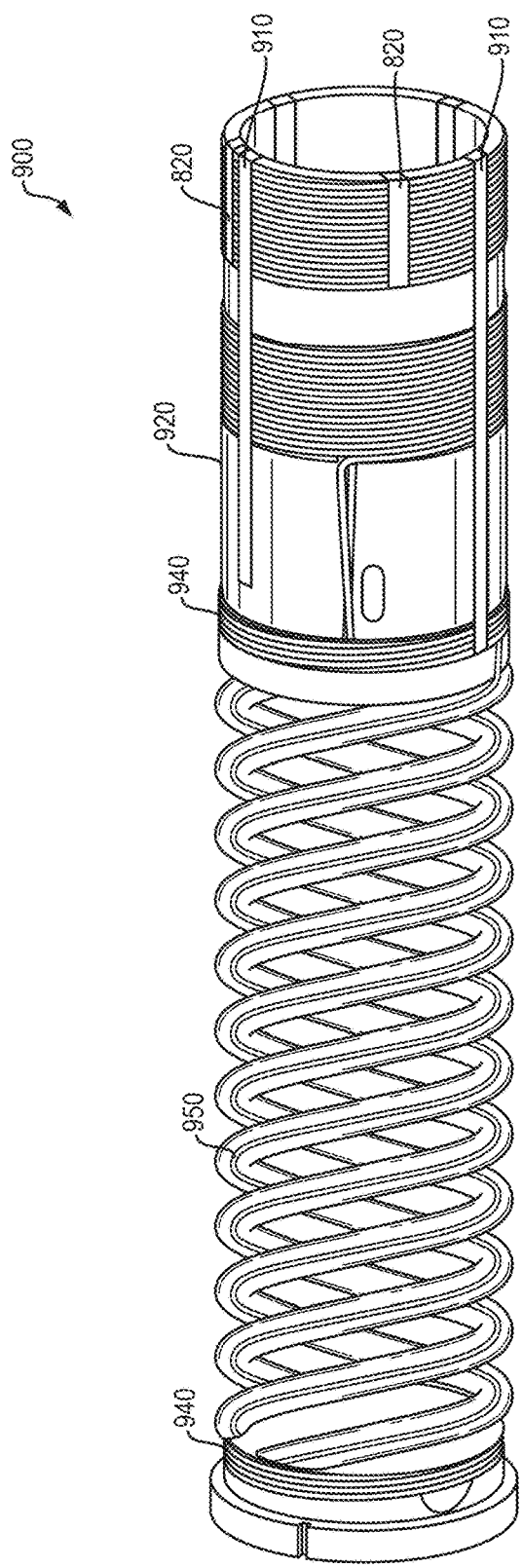
FIG. 9 is a perspective view of the example alternator coil assembly of FIG. 8, now coupled to the coil standoff and a spring (e.g., a triple helix spring)

The return flux linear alternator 340 may employ a variety of structures to increase mechanical strength. For example, a layer of reinforcement fabric (e.g., a unidirectional layer of aramid fiber with strands aligned in the axial direction) may be bonded to the alternator coil assembly. FIG. 8 is a perspective view of an example alternator coil assembly with the coil standoff 345 detached from the upper coil section 350. Further, FIG. 9 is a perspective view 900 of the example alternator coil assembly of FIG. 8, now coupled to the coil standoff 345 and a spring (e.g., a triple helix spring) 335. The layer of reinforcement fabric is bonded to the internal surface of the upper coil section 350 and lower coil section 355, for example, with coil impregnation epoxy. A first portion 810 of the layer extends above the upper coil section 350 and is attached, for example by adhesive, to the coil standoff 345 when there disposed, to provide additional mechanical strength to the connection. Further, a second portion of the layer of reinforcement fabric, for example, formed into narrow strips 820, extends below the lower coil section 355 and is wrapped about and outer surface of the lower coil section 355 to provide additional mechanical strength to the coil itself. The narrow strips 820 are bonded to the outer surface, for example, with coil impregnation epoxy. Furthermore, as is visible in FIG. 9, additional outer reinforcement strips 910 of reinforcement fabric may be adhered to the outer surface of the coil standoff 345 when connected to the coil, to extend over the outer surface of both coil sections 810, 820 to provide further mechanical strength.

In addition, the return flux linear alternator 340 may employ a variety of structures to increase electrical efficiency. For example, the above described coil spacer 360, in addition to helping to physically separate the upper coil section 350 and the lower coil section 355, may serve to manage heat to thereby increase electrical efficiency. In one embodiment, the coil spacer 360 is constructed from an electrically non-conductive material, such as aluminum nitride-boron nitride composite ceramic. The thermal conductive nature of the coil spacer 360 serves to conduct heat away from the upper coil section 350 and the lower coil section 355 and transfer this heat to air that flows by the coil spacer 360 when it reciprocates during operation of the return flux linear alternator 340. By reducing the coil temperature, resistivity of the coil is reduced. The electrically nonconductive nature of the coil spacer 345 serves to prevent eddy current heating of the spacer which would reduce the electrical efficiency by raising the temperature and thereby the resistivity of the coil.

Another structure that may increase electrical efficiency is multiple pairs of electrical leads extending from the coil. The multiple pairs of electrical leads reduce total resistance and thereby electrical losses. In one embodiment, a short initial pair of leads 920 from the coil is coupled to a lower crown terminal 930 where it is split into multiple pairs of leads (e.g., 3 pairs of leads) 950 that each are routed up the spring 335 (e.g., each on one helix of the triple helix spring) to an upper crown terminal 930, where the multiple pairs of leads are rejoined. The crown terminals 930, 940 may be constructed as 2-layer flex circuits on a flexible substrate.

Figure 10:
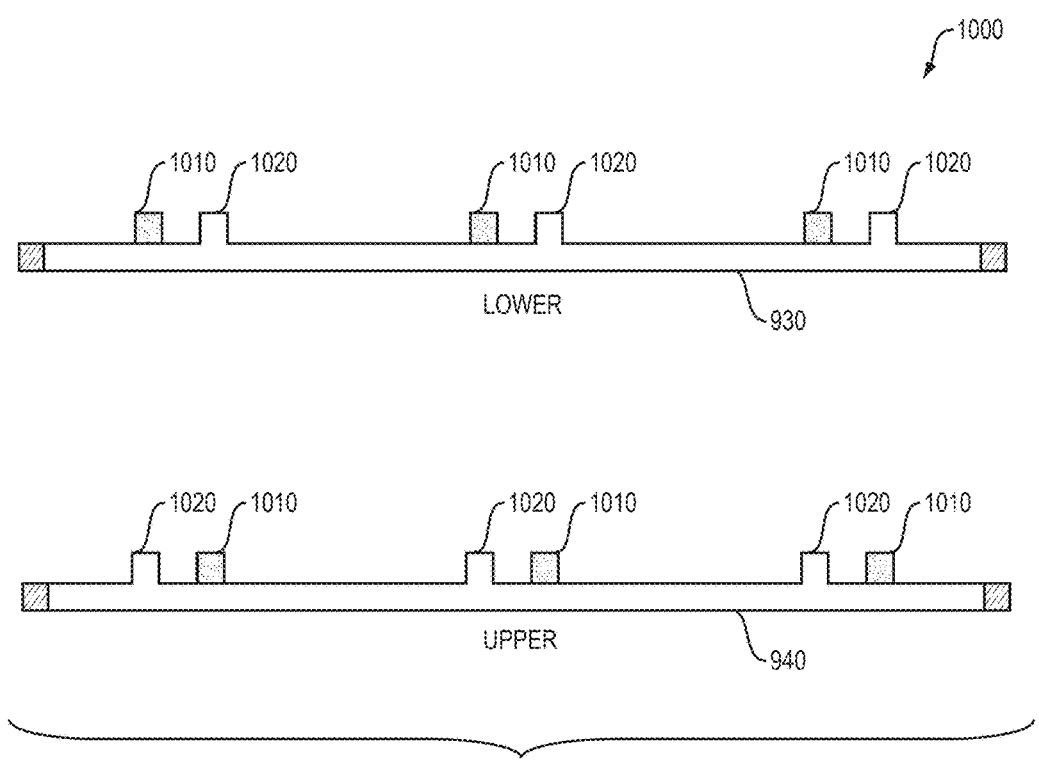
FIG. 10 is a diagram of an example set of crown terminals that may be employed to split electrical leads of an example return flux linear alternator.

FIG. 10 is a diagram of an example set of crown terminals 930, 940 that may be employed to split electrical leads of an example return flux linear alternator 340. The shaded tabs 1010 indicate connections having a first common polarity, while the unshaded tables 1020 indicate connections having another a second common polarity. While shown flat in this illustration, when used the crown terminals 930, 940 are flexed into a substantially cylindrical shape to match the spring 335.

In summary, the above description details an example return flux linear alternator that may offer reduced weight in comparison to traditional linear alternator designs, in addition to other mechanical and electrical benefits. It should be understood that various adaptations and modifications may be made to what is described above, to suit various requirements of the system with which the return flux linear alternator may be used. While an example of a linear electric generator is provided above, it should be understood that the return flux linear alternator may be utilized in a variety of other types of systems. Above all, it should be understood that the above descriptions are meant to be taken only by way of example. What is claimed is:

The invention claimed is:

1. A return flux linear alternator, comprising:
    a magnet assembly defining a pair of air gaps, including:
        an upper permanent ring magnet having a first polarity defining an upper air gap,
        a lower permanent ring magnet having a second polarity that is opposite the first polarity defining a lower air gap,
        a magnet spacer positioned between the upper permanent ring magnet and the lower permanent ring magnet, and
        a magnet pole; and
    an alternator coil assembly that is linearly movable in the pair of air gaps, including:
        an upper coil section wound in a first direction movable in the upper air gap,
        a lower coil section wound in a second direction that is opposite the first direction movable in the lower air gap, and
        a coil spacer positioned between the upper coil section and the lower coil section,
    wherein a magnetic flux loop is created that extends through the upper permanent ring magnet, the upper air gap, a first portion of the magnet pole, the lower air gap, the lower permanent ring magnet and a second portion of the magnet pole.

2. The return flux linear alternator of claim 1, wherein magnet pole does not extend lower in an axial direction than the lower permanent ring magnet.

3. The return flux linear alternator of claim 1, wherein the first portion of the magnet pole is an inner magnet pole that is disposed within the alternator coil assembly, the second portion of the magnet pole is an outer magnet pole that is disposed external to the upper permanent ring magnet and the lower permanent ring magnet, and the inner magnet pole and the outer magnet pole are separate from each other.

4. The return flux linear alternator of claim 3, wherein at least one of the inner magnet pole and the outer magnet pole has an acute trapezoidal cross section.

5. The return flux linear alternator of claim 1, further comprising:
    an alternator casing coupled to the magnet pole and configured to hold the magnet pole in place in the magnet assembly.

6. The return flux linear alternator of claim 5, wherein magnet pole is made from a magnetic alloy, and the alternator casing is made from a material that is lighter per unit volume than the magnetic alloy.

7. The return flux linear alternator of claim 6, wherein the material is aluminum or plastic.

8. The return flux linear alternator of claim 1, wherein a reinforcement fabric is bonded to an inner surface of the upper coil section and the lower coil section.

9. The return flux linear alternator of claim 8, further comprising:
    a coil stand off connected to the upper coil section,
    wherein the reinforcement fabric extends above the upper coil section and is bonded to the coil stand off, and the reinforcement fabric extends below the lower coil section and is wrapped about and outer surface of the lower coil section.

10. The return flux linear alternator of claim 8, wherein the reinforcement fabric is an aramid fiber.

11. The return flux linear alternator of claim 1, wherein the coil spacer is made from a thermally conductive but electrically nonconductive material.

12. The return flux linear alternator of claim 11, wherein the thermally conductive but electrically nonconductive material is aluminum nitride-boron nitride composite ceramic.

13. The return flux linear alternator of claim 1, wherein the return flux linear alternator is part of a linear electric generator that includes a piston and a spring, the piston configured to reciprocate the alternator coil assembly through the magnet assembly against the resistive force on the alternator coil.

14. The return flux linear alternator of claim 13, further comprising a first crown terminal coupled to the alternator coil assembly, and a second crown terminal coupled to an upper portion of the spring, and a plurality of pairs of electrical leads extending between the first crown terminal and the second crown terminal.

15. A return flux linear alternator, comprising:
    a magnet assembly, including:
        an upper magnet having a first polarity defining an upper air gap,
        a lower magnet having a second polarity that is opposite the first polarity defining a lower air gap, and
        a magnet pole; and
    an alternator coil assembly, including:
        an upper coil section wound in a first direction disposed in the upper air gap, and
        a lower coil section wound in a second direction that is opposite the first direction disposed in the lower air gap,
    wherein a magnetic flux loop is created that extends through the upper magnet, the upper air gap, a first portion of the magnet pole, the lower air gap, the lower magnet and a second portion of the magnet pole.

16. The return flux linear alternator of claim 15, wherein the alternator coil assembly further includes a magnet spacer positioned between the upper magnet and the lower magnet, and a coil spacer positioned between the upper coil section and the lower coil section.

17. The return flux linear alternator of claim 15, wherein the return flux linear alternator is part of a linear electric generator that includes a cylinder head, a piston disposed in the cylinder head, a rod coupled at its upper end to the piston and at its lower end to the alternator coil assembly, and a spring coupled to the alternator coil assembly, the piston configured to move within the cylinder head and to reciprocate the alternator coil through the magnet assembly against the resistance of the spring.

18. A linear electric generator comprising:
a cylinder head;
a piston disposed in the cylinder head;
a return flux linear alternator including:
- a magnet assembly defining air gaps, the magnet assembly including an upper magnet having a first polarity and a lower magnet having a second polarity that is opposite the first polarity, and
- an alternator coil assembly that is linearly movable in the air gaps, the alternator coil assembly including an upper coil section wound in a first direction, and a lower coil section wound in a second direction that is opposite the first direction;

a rod coupled at its upper end to the piston and at its lower end to the alternator coil assembly; and
a spring coupled to the alternator coil assembly,
wherein the piston is configured to move within the cylinder head and to reciprocate the alternator coil assembly through the magnet assembly against the resistive force on the alternator coil assembly.

19. The linear electric generator of claim 18, wherein the return flux linear alternator further includes a magnetic pole comprising an inner magnet pole that is disposed within the alternator coil assembly and an outer magnet pole that is disposed external to the upper magnet and the lower magnet, and
wherein a magnetic flux loop is created that extends through the upper magnet, the upper coil section, an inner portion of the magnet pole, the lower coil section, the lower magnet and an outer portion of the magnet pole.

20. The linear electric generator of claim 18, wherein the alternator coil assembly further includes a magnet spacer positioned between the upper magnet and the lower magnet, and a coil spacer positioned between the upper coil section and the lower coil section.

* * * * *